United States Patent
Tsuda et al.

(10) Patent No.: US 6,350,806 B1
(45) Date of Patent: Feb. 26, 2002

(54) AQUEOUS FLUOROPOLYMER DISPERSION COMPOSITION

(75) Inventors: Nobuhiko Tsuda; Katsuhiko Imoto; Nobuo Mitsuhata; Masaru Nagato, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/529,977

(22) PCT Filed: Oct. 13, 1998

(86) PCT No.: PCT/JP98/04602
§ 371 Date: Apr. 24, 2000
§ 102(e) Date: Apr. 24, 2000

(87) PCT Pub. No.: WO99/21919
PCT Pub. Date: May 6, 1999

(30) Foreign Application Priority Data

Oct. 24, 1997 (JP) .............................................. 9-292509

(51) Int. Cl.[7] ................................................. C08K 3/34
(52) U.S. Cl. ........................................ 524/492; 524/269
(58) Field of Search ......................................... 524/492

(56) References Cited

U.S. PATENT DOCUMENTS 3,721,574 A * 3/1973 Schneider .................... 106/74
4,373,043 A * 2/1983 Yagi ............................ 524/130
5,445,866 A * 8/1995 Martinson .................... 428/195

FOREIGN PATENT DOCUMENTS

| JP | 63-150354 | 6/1988 | ............ C09D/3/78 |
| JP | 7-53911 | 2/1995 | ......... C09D/127/12 |
| JP | 8-120210 | 5/1996 | ......... C09D/127/12 |
| JP | 8-120211 | 5/1996 | ......... C09D/127/12 |

OTHER PUBLICATIONS

English Translation of International Preliminary Examination Report for PCT/JP98/04602.

* cited by examiner

Primary Examiner—Paul R. Michl
(74) Attorney, Agent, or Firm—Sughrue Mion, PLLC

(57) ABSTRACT

An aqueous-dispersing composition which gives a coating being excellent in storage stability and forming a coating film being excellent in stain-proofing property and stain removable property and having sufficient gloss and hardness, and the composition contains said colloidal silica, in solid content, in an amount of more than 50 parts by weight up to 300 parts by weight and said organoalkoxysilane in an amount of 0.1 to 20 parts by weight on the basis of 100 parts by weight in solid content of an aqueous dispersion of fluorine-containing polymer particles.

4 Claims, No Drawings

AQUEOUS FLUOROPOLYMER DISPERSION COMPOSITION

TECHNICAL FIELD

The present invention relates to an aqueous-dispersing composition of fluorine-containing polymer, particularly an aqueous-dispersing composition of fluorine-containing polymer containing a colloidal silica and an organoalkoxysilane. The composition can be suitably used for various coatings or paints excellent in stain-proofing property, stain removable property and storage stability.

1. Background Art

In the field of paints, an aqueous dispersion prepared in combination use of a fluorine-containing polymer with colloidal silica and further organoalkoxysilane has been proposed. For example, JP-A-8-120210 discloses an aqueous-dispersing composition comprising an aqueous dispersion of composite resins composed of vinylidene fluoride copolymer and acrylic resin, a colloidal silica and further an organoalkoxysilane. However when an adding amount of colloidal silica is increased, there are problems that a desired gloss of a coating film is not obtained and cracking occurs. Thus there is a limit in hardness of the obtained coating film. As a result, stain-proofing property and stain removable property which are objects of the present invention are not satisfied. Also JP-A-7-53911 discloses a fluorine-containing coating composition comprising an aqueous dispersion of fluoroolefin polymer and an inorganic silicon compound as essential components. However there was a problem that the coating composition does not have enough storage stability as an aqueous dispersion for paints.

In view of the mentioned points, an object of the present invention is to obtain an aqueous-dispersing composition of fluorine-containing polymer which can give excellent stain-proofing property, stain removable property and storage stability when prepared by a combination of a specific fluorine-containing polymer with colloidal silica and organoalkoxysilane and added to a paint.

2. Disclosure of Invention

The present invention was made to solve the above-mentioned problem and relates to the aqueous-dispersing composition comprising an aqueous dispersion of fluorine-containing polymer particles, a colloidal silica and a organoalkoxysilane, and containing said colloidal silica, in solid content, in an amount of more than 50 parts by weight up to 300 parts by weight and said organoalkoxysilane in an amount of 0.1 to 20 parts by weight on the basis of 100 parts by weight in solid content of an aqueous dispersion of fluorine-containing polymer particles.

In the present invention, it is preferable that the fluorine-containing polymer particles in the above-mentioned aqueous dispersion are fluorine-containing seed polymer particles obtained by seed-polymerizing a monomer having a reactive α,β-unsaturated group in the presence of fluorine-containing polymer particles.

Also in the present invention, it is preferable that the fluorine-containing polymer in the above-mentioned aqueous dispersion of fluorine-containing polymer particles has at least one functional group selected from —OH group, —COOH group and a hydrolyzable silyl group.

In the present invention, an aqueous dispersion prepared by condensation by adding organoalkoxysilane in the presence of colloidal silica particles is added to the aqueous dispersion of fluorine-containing polymer particles and thus those components form an organic-inorganic complex.

BEST MODE FOR CARRYING OUT THE INVENTION

The aqueous-dispersing composition of the present invention comprises an aqueous dispersion of fluorine-containing polymer particles and specific amounts of colloidal silica and organoalkoxysilane. Each component is explained below.

1. Aqueous Dispersion of Fluorine-containing Polymer Particles

Examples of the fluorine-containing polymer particles are particles of fluoroolefin polymer, copolymers of a fluoroolefin and a monomer copolymerizable with the fluoroolefin, seed polymers of those polymers with a resin containing no fluorine, and the like.

As the above-mentioned fluoroolefin, fluoroolefins having 2 to 4 carbon atoms, for example, vinyl fluoride, vinylidene fluoride (VdF), tetrafluoroethylene (TFE), chlorotrifluoroethylene (CTFE), hexafluoropropylene (HFP), trifluoroethylene, and the like are used.

(1) Fluoroolefin Polymer

Examples of the polymer of the above-mentioned fluoroolefins are, for instance, homopolymers of the above-mentioned fluoroolefins and known copolymers of two or more fluoroolefins. There are homopolymers of VdF, TFE and CTFE, VdF/TFE copolymer, VdF/HFP copolymer, VdF/CTFE copolymer, VdF/TFE/CTFE copolymer, VdF/TFE/HFP copolymer, TFE/HFP copolymer, and the like.

The aqueous dispersions of particles of those fluoroolefin polymers are prepared by usual emulsion polymerization. Namely the aqueous dispersions can be obtained by emulsion-polymerizing a fluoroolefin monomer or a mixture of fluoroolefin monomers in the presence of an emulsifying agent of not more than 5% by weight, preferably not more than 1% by weight on the basis of water.

It is preferable that water to be used in the emulsion polymerization is de-ionized water. Also it is preferable that the emulsifying agent is a fluorine-containing surfactant. Further a reactive fluorine-containing emulsifying agent can also be used. Also a slight amount of non-fluorine-containing nonionic emulsifying agent can be used together.

The fluorine-containing emulsifying agent to be used in the present invention means a compound containing a fluorine atom in its structure and having a surface-activating ability or a mixture of two or more thereof. Examples of the compound are, for instance, an acid represented by $X(CF_2)_n COOH$, in which n is an integer of 6 to 20, X is F or H, its metal salt, ammonium salt, amine salt or quaternary ammonium salt; $Y(CH_2CF_2)_m COOH$, in which m is an integer of 6 to 13, Y is F or Cl, its metal salt, ammonium salt, amine salt or quaternary ammonium salt; and the like. In addition, it is possible to use a reactive emulsifying agent disclosed in JP-A-8-67795 solely or in combination with the above-mentioned fluorine-containing emulsifying agent. Also it is possible to use a non-fluorine-containing nonionic emulsifying agent disclosed in JP-A-7-90153 together.

(2) Copolymer of Fluoroolefin and Monomer Copolymerizable with Fluoroolefin

As the monomers being copolymerizable with the above-mentioned fluoroolefins, there are, for example, α-olefins such as ethylene, propylene and isobutylene; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether and polyoxyethylene vinyl ether; alkenyls such as polyoxyethylene allyl ether, ethyl allyl ether, hydroxyethyl allyl ether, allyl alcohol and allyl ether; vinyl esters such as vinyl acetate, vinyl lactate, vinyl butyrate, vinyl pivalate, vinyl benzoate, and VEOVA9 and VEOVA10 (brand names of Shell Chemical Co., Ltd.); ethylenically unsaturated carboxylic acids such as itaconic anhydride, succinic anhydride and crotonic acid; and the like. Particularly α-olefins, vinyl ethers, vinyl esters and alkenyls are used preferably.

Examples of the above-mentioned copolymers are TFE/propylene copolymer, TFE/ethylene copolymer, TFE/vinyl ester copolymer, TFE/vinyl ether copolymer, HFP/vinyl ether copolymer, HFP/vinyl ester copolymer, CTFE/vinyl ether copolymer, and the like. Further there are polymers comprising three or more monomers, which contain, in addition to the above-mentioned copolymer, a monomer copolymerizable with the above-mentioned fluoroolefin as a modified monomer in an amount of not more than 30% by mole.

The aqueous dispersions of particles of those fluoroolefin copolymers are prepared by usual emulsion polymerization. A process for emulsion polymerization may be the same as the process for polymerization of the fluoroolefin polymer of above (1) except that a mixture of a fluoroolefin and a monomer copolymerizable with the fluoroolefin is used.

It is preferable that the fluoroolefin monomer is contained in the mentioned copolymer of the fluoroolefin and monomer copolymerizable therewith in an amount of 20 to 80% by mole. When the content of the fluoroolefin monomer is less than 20% by mole, there is a tendency that weather resistance is not exhibited sufficiently, and when more than 80% by mole, there is a tendency that when a coating is made and a coating film is formed, appearance is lowered.

It is preferable to introduce at least one functional group selected from hydroxyl group, carboxyl group and hydrolyzable silyl group into the copolymer of fluoroolefin and monomer copolymerizable with the fluoroolefin. An amount of the functional group is preferably from 0.1 to 30% by mole on the basis of the whole copolymer. When the amount is less than 0.1% by mole, an effect of improvement in compatibility of the copolymer with colloidal silica is lowered, and when more than 30% by mole, there is a case where weather resistance, etc. are lowered. Further a resin having carboxyl group and hydroxyl group or a resin having carboxyl group and hydrolyzable silyl group is preferred from the viewpoint of storage stability.

Examples of the monomer which can be used preferably for introducing hydroxyl group, carboxyl group or hydrolyzable silyl group are as follows. Examples of the monomer having hydroxyl group are hydroxyl-containing vinyl ethers such as HBVE; hydroxyl-containing allyl compounds such as allyl alcohol and hydroxyethyl allyl ether; hydroxyl-containing (meth)acrylates such as hydroxyethyl (meth)acrylate, hydroxypropyl (meth)acrylate, hydroxybutyl (meth)acrylate and polyethylene glycol (meth)acrylate; and the like. Examples of the monomer having carboxyl group are α,β-unsaturated carboxylic acids such as acrylic acid, methacrylic acid, fumaric acid, crotonic acid and itaconic acid. Examples of the monomer having a hydrolyzable silyl group are alkoxysilyl group-containing monomers such as γ-mathacryloxypropyltrimethoxysilane and vinyltrimethoxysilane.

(3) Seed Polymer

Examples of the fluoroolefin polymer or the seed polymer obtained from a copolymer of fluoroolefin and monomer copolymerizable with fluoroolefin and a resin containing no fluorine are polymers of the above-mentioned fluoroolefins and fluorine-containing seed polymers obtained by seed-polymerizing a monomer having an unsaturated bond being radically polymerizable in water medium, in the presence of particles of a copolymer of fluoroolefin and monomer copolymerizable with fluoroolefin, and the like.

Among those particles of fluorine-containing polymer, VdF copolymer particles are preferred and copolymer particles containing not less than 50% by mole of VdF unit are preferred more from the viewpoint of good compatibility with an acrylic monomer in the seed polymerization.

Examples of the monomer having an unsaturated bond being radically polymerizable are alkyl acrylates having alkyl of C1 to C18, alkyl methacrylates having alkyl of C1 to C18 and monomers being copolymerizable therewith and having an ethylenically unsaturated unit.

Examples of the alkyl acrylates having an alkyl group of C1 to C18 are, for instance, methyl acrylate, ethyl acrylate, propyl crylate, n-butyl acrylate, isobutyl acrylate, 2-ethylhexyl acrylate, lauryl acrylate, and the like.

Examples of the alkyl methacrylates having an alkyl group of C1 to C18 are, for instance, methyl methacrylate, ethyl methacrylate, propyl methacrylate, n-propyl methacrylate, isobutyl methacrylate, cyclohexyl methacrylate, lauryl methacrylate, and the like.

Also for the purpose to enhance solvent resistance and water resistance, it is possible to copolymerize a polyfunctional monomer such as ethylene glycol dimethacrylate or propylene glycol dimethacrylate.

Examples of the monomer having an ethylenically unsaturated unit and being copolymerizable with the acrylic ester and/or methacrylic ester are, for instance, α-olefins such as ethylene, propylene and isobutylene; vinyl ethers such as ethyl vinyl ether (EVE), cyclohexyl vinyl ether (CHVE), hydroxy butyl vinyl ether (HBVE), butyl vinyl ether, isobutyl vinyl ether, methyl vinyl ether and polyoxyethylene vinyl ether; alkenyls such as polyoxyethylene allyl ether, ethyl allyl ether, hydroxyethyl allyl ether, allyl alcohol and allyl ether; vinyl esters such as vinyl acetate, vinyl lactate, vinyl butyrate, vinyl pivalate, vinyl benzoate, and VEOVA9 and VEOVA10 (brand names available from Shell Chemical Co., Ltd.); ethylenically unsaturated carboxylic acids such as itaconic anhydride, succinic anhydride and crotonic acid; aromatic vinyl compounds such as styrene, α-methylstyrene and p-tert-butylstyrene; acrylonitrile; and the like.

In the present invention, it is preferable that a content of the fluoroolefin monomer is from 20 to 90% by mole on the basis of the whole seed polymer. When the content of the fluoroolefin monomer is less than 20% by mole, there is a tendency that weather resistance is not exhibited sufficiently, and when more than 90% by mole, at the time of making a coating and forming a coating film, its appearance tends to be lowered, In the seed polymerization, it is preferable that in the seed polymerization process, one or two or more functional groups selected from hydroxyl group, carboxyl group and hydrolyzable silyl group is introduced. An amount of the introduced functional group is from 0.1 to 30% by mole on the basis of the whole seed polymer. When the amount is less than 0.1% by mole, an effect of improvement in compatibility of the copolymer with colloidal silica is lowered, and when more than 30% by mole, there is a case where weather resistance, etc. are lowered. Further a resin having carboxyl group and hydroxyl group or a resin having carboxyl group and hydrolyzable silyl group is preferred from the viewpoint of storage stability.

As the preferred monomers having hydroxyl group, carboxyl group or hydrolyzable silyl group, those exemplified in (2) above can be used.

The seed polymerization of the ethylenically unsaturated monomer can be carried out under the same conditions as in usual emulsion polymerization. For example, into a water medium containing particles of the fluorine-containing polymer are added a surfactant, a polymerization initiator, a chain transfer agent and as case demands, a chelating agent, a pH control agent, a solvent, etc. and then polymerization reaction of the monomer (b) is conducted at about 20° C. to about 80° C. for about 0.5 hour to about 6 hours.

When the ethylenically unsaturated monomer is emulsion-polymerized in the presence of particles of the fluorine-containing polymer, it seems that at first, there occurs swelling of the particles of the fluorine-containing polymer with the monomer and at that time, the mixture becomes in the state of an aqueous dispersion of the fluorine-containing polymer dissolved uniformly in the monomer, and then the monomer is polymerized by adding an initiator, thus forming single phase polymer blend particles, in which the molecular chains of the polymers are entangled with each other.

As a surfactant, there is used an anionic surfactant, nonionic surfactant or combination of the anionic and nonionic surfactants, and as case demands, an amphoteric surfactant can be used.

Examples of the anionic surfactant are a sulfate of higher alcohol, sodium alkylsulfonate, sodium alkylbenzenesulfonate, sodium dialkylsulfosuccinate, sodium alkyldiphenylether disulfonate, and the like. Examples of the nonionic surfactant are polyoxyethylene alkyl ethers, polyoxyethylene alkyl phenyl ethers, polyoxyethylene alkyl esters, polyoxyethylene alkyl phenyl esters, sorbitan alkyl esters, glycerol esters, their derivatives, and the like.

As the amphoteric surfactant, there are lauryl betaine, and the like. Further a so-called reactive emulsifying agent which is copolymerizable with the ethylenically unsaturated monomer can be used.

Examples of commercially available reactive emulsifying agent are Blemmar PE-350, Blemmar PME-400 and Blemmar 70PEP350B (available from NOF Corporation); NK Ester M-40G, NK Ester M-90G and NK Ester M-230G (available from Shin-Nakamura Kagaku Kabushiki Kaisha); RMA450M (available from Nippon Nyukazai Kabushiki Kaisha); Aquaron HS10, Aquaron HS20, Aquaron HS1025, Aquaron RN10, Aquaron RN20, Aquaron RN30, Aquaron RN50 and Aquaron RN2025 (available from Dai-ichi Kogyo Seiyaku Kabushiki Kaisha); NK Ester AMP-60G, NK Ester CB-1, NK Ester SA and NK Ester A-SA; Eleminol JS2 and Eleminol RS30 (available from Sanyo Kasei Kogyo Kabushiki Kaisha); Latemle WX (available from Kao Corporation); and the like.

An amount of the surfactant is usually from about 0.05 part by weight to about 5.0 parts by weight on the basis of 100 parts by weight of the ethylenically unsaturated monomer.

The initiator is not particularly limited as far as a radical which can be used for free radical polymerization in aqueous medium is produced at 20° to 90° C. As case demands, the initiator can be used in combination with a reducing agent. Examples of the water-soluble initiator are, for instance, a persulfate, hydrogen peroxide, 2,2-azobis(2-amidinopropane) hydrochloride (AIBA) and the like; and examples of the reducing agent are sodium pyrosulfite, sodium hydrogensulfite, sodium L-ascorbate, and the like. Examples of oil-soluble initiator are diisopropylperoxydicarbonate (IPP), benzoyl peroxide, dibutyl peroxide, azobisisobutyronitrile (AIBN), and the like. An amount of the initiator is usually from about 0.05 part by weight to about 2.0 parts by weight on the basis of 100 parts by weight of the ethylenically unsaturated monomer.

A polymerization temperature may be from 200° to 90° C.

Examples of the chain transfer agent are a halogenated hydrocarbon (for example, chloroform, carbon tetrachloride, or the like), mercaptans (for example, n-dodecyl mercaptan, t-dodecyl mercaptan or n-octyl mercaptan) and the like. An amount of the chain transfer agent is usually from 0 to about 5.0 parts by weight on the basis of 100 parts by weight of the ethylenically unsaturated monomer.

As the solvent, there may be used methyl ethyl ketone, acetone, trichlorotrifluoroethane, methyl isobutyl ketone, cyclohexanone, ethyl acetate, or the like in such a small amount as not lowering workability, safety against disaster, safety in environment and safety in production. By adding the solvent, there is a case where swelling property of the monomer into the particles of the fluorine-containing polymer for seed polymerization is improved.

The seed polymerization can be carried out by known method, for example, a method of charging the whole amount of monomer in one lot in a reaction system in the presence of the particles of the fluorine-containing polymer, a method of charging a part of the monomer for the reaction and then charging the remaining monomer continuously or dividedly or a method of charging the whole amount of monomer continuously.

With respect to the fluorine-containing polymer used for the seed polymerization, it is preferable that a particle size of the polymer in the aqueous dispersion is not more than 180 nm, more preferably not more than 150 nm and a content of the polymer is in the range of from 30 to 50% by weight, more preferably from 35 to 60% by weight in order to decrease the particle size after the seed polymerization to not more than 200 nm. When the particle size after the seed polymerization exceeds 200 nm, there is a case where sedimentation stability of the aqueous dispersion is lowered and an increase in a minimum film forming temperature of the aqueous dispersion occurs even if the resins having the same composition is used.

2. Colloidal Silica

Colloidal silica to be used in the present invention is prepared, for example, by removing sodium from water glass (ion-exchange method, acid decomposition method, deflocculation method). A primary particle size is from 4 to 150 nm. Usually a colloidal silica having a primary particle size of from 5 to 50 nm is available in the form of aqueous dispersion and used as it is. In the present invention, an average particle size of the colloidal silica has a close relation with appearance of a coating film and storage stability. The average particle size is preferably from 10 to 40 nm. If less than 20 nm, when an amount of the colloidal silica in a coating film is increased, lowering of gloss easily arises, and if more than 50 nm, storage stability of the dispersion tends to be lowered.

In the present invention, an adding amount in a solid content of colloidal silica is more than 50 parts (part by weight, hereinafter the same) up to 300 parts, preferably more than 50 parts up to 200 parts on the basis of 100 parts in a solid content of the aqueous dispersion of fluorine-containing polymer. When the adding amount is not more than 50 parts, a surface hardness is decreased and as a result, stain-proofing property, stain removable property, etc. are lowered. When more than 300 parts, cracking occurs on a coating film with a lapse of time, thus lowering durability and a coating film having gloss cannot be obtained.

Preferred colloidal silica is one being stable in the form of dispersion by using an electrolyte, organic additive, or the like. Example of such a colloidal silica commercially available are, for instance, colloidal silica stabilized with an amine or metal salt such as brand names SNOWTEX-O, SNOWTEX-OL, SNOWTEX-20, SNOWTEX-C, SNOWTEX-N, SNOWTEX-CM30, SNOWTEX-CM40, SNOWTEX-CAS40 or SOM1 (available from Nissan Kagaku Kogyo Kabushiki Kaisha); modified colloidal silica such as APZ-6613, APZ-6614 or APZ-6615 (available from Nippon Unika Kabushiki Kaisha), brand names HS-40, HS-30, LS, SM-30, TM, AS or AM (available from du Pont, U.S.A.), brand name NARCORK (available from Narco Chemical Co., Ltd., U.S.A.), brand name MITON (available from Monsant Industrial Chemicals Co., Ltd., U.S.A.), and the like.

3. Explanation on Organoalkoxysilane

Organoalkoxysilane to be used in the present invention are monomers represented by the formula (I);

$$R^1{}_a Si(OR^2)_{4-a} \qquad (I)$$

wherein $R^1$ is a non-hydrolyzable group or hydrogen atom, $R^2$ is alkyl, aryl, alkenyl or hydrogen atom, a is 0, 1 or 2.

In the above-mentioned formula (I), examples of the non-hydrolyzable group are, for instance, alkyl such as methyl, ethyl or propyl; aryl such as phenyl, tolyl or mesityl; alkenyl such as vinyl or allyl; haloalkyl such as γ-chloropropyl; aminoalkyl such as γ-aminopropyl or γ-(2-aminoethyl)aminopropyl; epoxyalkyl such as γ-glycidoxypropyl or β-(3,4-epoxycyclohexyl)ethyl; methacryloyloxyalkyl such as γ-mercaptoalkyl or γ-methacryloyloxypropyl; hydroxyalkyl such as γ-hydroxypropyl; and the like. Among those substituents, preferred in the present invention are alkyls having not more than 8, preferably not more than 4 carbon atoms from the viewpoint that when the number of carbon atoms increases, a reactivity is lowered; alkyls thereof having a substituent such as aminoalkyl, epoxyalkyl, mthacryloyloxyalkyl and hydroxyalkyl, and phenyl which is a kind of aryl, and alkenyl having 2 or 3 carbon atoms. With respect to alkyl, aryl and alkenyl represented by $R^2$, like the above-mentioned $R^1$, particularly preferred are alkyl having 4 or less carbon atoms from the viewpoint that when the number of carbon atoms is larger, a reactivity is lowered.

Examples of the monomer represented by the formula (I) are, for instance, tetramethoxysilane, tetraethoxysilane, tetrapropoxysilane, methyltrimethoxysilane, methyltriethoxysilane, dimethyldimethoxysilane, vinyltriethoxysilane, phenyltrimethoxysilane, phenyltriethoxysilane, γ-chloropropyltrimethoxysilane, γ-aminopropyltrimethoxysilane, N-(β-aminoethyl)aminopropyltrimethoxysilane, γ-glycidoxypropyltrimethoxysilane, β-(3,4-epoxycyclohexyl)ethyltrimethoxysilane, γ-mercaptopropyltrimethoxysilane, γ-methacryloyloxypropyltrimethoxysilane, γ-hydroxypropyltrimethoxysilane, and the like. From the viewpoint of reactivity, film forming property, flexibility, and the like, preferred are methyltrimethoxysilane, phenyltrimethoxysilane, γ-methacryloyloxypropyltrimethoxysilane, and the like.

In the present invention, organoalkoxysilane is used together with the colloidal silica. In that case, an amount in solid content of organoalkoxysilane is from 0.1 to 20 parts, preferably from 0.5 to 10 parts on the basis of 100 parts in solid content of fluorine-containing polymer particles. When the amount of organoalkoxysilane is less than 0.1 parts, storage stability of a coating is lowered, and when more than 20 parts, stains easily stick to a coating film outdoors.

In the present invention, a mixing method in preparing the aqueous-dispersing composition is not particularly limited. For example, there are a method of adding colloidal silica and organoalkoxysilane simultaneously to the aqueous dispersion of fluorine-containing polymer particles and mixing with stirring, a method of pre-mixing and stirring the aqueous dispersion of fluorine-containing polymer particles and colloidal silica and then adding organoalkoxysilane to the mixture, a method of pre-mixing and stirring the aqueous dispersion of fluorine-containing polymer particles and organoalkoxysilane and then adding colloidal silica to the mixture, a method of previously treating colloidal silica with organoalkoxysilane and then adding the treated colloidal silica to the aqueous dispersion of fluorine-containing polymer particles, and the like method. In that case, it is possible to use an anionic or nonionic emulsifying agent as a known surfactant in an amount of not more than 10% by weight on the basis of the aqueous dispersion. By the addition of surfactant, there is a case where appearance of a coating film and storage stability of a coating can be improved.

Also it is preferable to heat-treat the obtained composition at a temperature of from room temperature to a boiling point of water since a time for converging a viscosity of a coating into a stable range can be shortened.

Among the above methods, preferred is a method of previously treating colloidal silica with organoalkoxysilane and then mixing the treated colloidal silica to the aqueous dispersion of fluorine-containing polymer, namely a method of adding organoalkoxysilane in the presence of colloidal silica for condensation and then adding the obtained aqueous dispersion to the aqueous dispersion of fluorine-containing polymer.

According to that method, it seems that the fluorine-containing polymer particles, colloidal silica and organoalkoxysilane or condensate thereof form an organic-inorganic complex. Though the reaction process thereof is not sure, it can be assumed that while hydroxyl group on a surface of colloidal silica is chemically bonded to alkoxysilane in organoalkoxysilane through reactions such as hydrolyzation or condensation, on the other hand, an organic portion of alkoxysilane contributes to give compatibility with the resin portion and, as a result, an unexpected effect more than simple blending can be exhibited. Also it can be understood that an alkoxysilane residue which causes lowering of storage stability of aqueous-dispersing coating composition is used for the reaction before mixing to the resin and as a result, the storage stability is improved.

As a method of previously treating colloidal silica with organoalkoxysilane, there are a method of mixing, with stirring, organoalkoxysilane to a commercially available colloidal silica at a temperature of from room temperature to a boiling point of water for 10 minutes to 24 hours, further a method of adding a hydrolyzable catalyst having a hydrolyzable silyl group, and the like method. By that treatment, it is possible to improve storage stability of the aqueous-dispersing composition of organic/inorganic complex comprising fluorine-containing polymer particles, colloidal silica and organoalkoxysilane condensate.

The aqueous-dispersing composition of fluorine-containing polymer of the present invention can be used in the form of aqueous paint as a surface preventive coating for an inorganic substrate such as concrete, slate or ALC plate and a metallic substrate and further as a coating for coated paper by adding additives such as a pigment, thickener, dispersing agent, anti-foaming agent, anti-freezing agent, film forming auxiliary, ultraviolet ray absorbing agent and antioxidant which are generally used for aqueous emulsion paints. Also the aqueous dispersion and the mixture of aqueous dispersions can be used as a coating for patterning by adding thereto natural stone, synthetic resin beads or known inorganic filler for flatting.

Further the aqueous-dispersing composition can be used as an aqueous paint for exterior and/or interior of medium- and low-storied building.

For application as a paint, a solid content of the aqueous-dispersing composition of the present invention may be adjusted so as to be from about 5% by weight to about 95% by weight, usually from 20 to 90% by weight on the basis of the paint though it varies depending on a form of paint, coating method, etc.

For application of such an aqueous paint, known application method can be employed. In the application, known coating apparatuses such as brush, roller, roll coater, air sprayer, airless sprayer, electrostatic coating machine, dip coater and electrocoating machine can be used.

The above-mentioned aqueous paint can be applied to various substrates, i.e. not only metals such as iron, aluminum, copper and alloys thereof but also inorganic materials such as glass, cement and concrete, resins such as FRP, acrylic resin, vinyl chloride resin, polycarbonate resin and polyurethane resin, wood and fiber. Also if necessary, a substrate may be subjected to pre-coating or surface treating of an under coating such as a known aqueous resin emulsion coating or solvent type coating. The coating composition can be applied after optionally carrying out under-coating or pre-coating. The coating system can be applied as a clear coating or enamel coating on various known substrates having uneven surface patterns and color patterns After the application, a coating film is usually dried for curing at 5° to 300° C. for 30 seconds to one week. A coating thickness is not particularly limited, and is usually from about 1 $\mu$m to about 200 $\mu$m, preferably from 5 to 100 $\mu$m, more preferably from 10 to 50 $\mu$m.

Since the so-obtained coated article is excellent in stain-proofing property, stain removable property, adhesion, weather resistance and chemical resistance and a surface of the coating film has a gloss, lubricity and hardness, the article can be used in a wide range of applications. Namely there are wide applications for coating of interior and exterior of electric appliances (electronic range, toaster, refrigerator, washing machine, hair dryer, television set, videocassette recorder, amplifier, radio, electric pot, rice cooker, radio with cassette recorder, cassette deck, compact disk player, video camera, etc.); interior and exterior of air conditioner such as indoor unit, outdoor unit, louver, duct, air cleaner and heater); illumination apparatuses such as fluorescent lamp, chandelier and reflection plate; furniture; machine parts; decorations; comb; frame of glasses; natural fiber; synthetic fiber (in the form of yarn or woven fabric obtained therefrom); interior and exterior of office machine (phone, facsimile machine, copying machine (including rollers), camera, overhead projector, prototype projector, clock, slide projector, desk, bookshelf, locker, shelf for documents, chair, bookends and electronic whiteboard); car-related parts (wheel, door mirror, lace, door handle, number plate, handle and instrument panel); cooking utensils (range hood, sink, cooking panel, cooking knife, chopping board, water tap, gas range and ventilator); for indoor coating of partition plate, bath unit, shutter, blind, curtain rail, accordion curtain, wall, ceiling and floor; and for outdoor coating of housing such as wall, handrail, door and shutter, and for outdoor coating of building such as sizing material of ceramic, foamed concrete panel, concrete panel, aluminum curtain wall, steel plate, galvanized steel plate, stainless steel plate, vinyl chloride sheet and window glass; and the like.

PREPARATION EXAMPLE 1

A 1-liter pressure resistant reaction vessel provided with a stirrer was charged with 500 ml of deionized water, 0.5 g of ammonium perfluorooctanate and 0.05 g of polyoxyethylene monostearate (POE40). After repeating introduction of nitrogen under pressure and deaeration and then removing dissolved oxygen, a pressure was applied at 60° C. up to 10 kgf/cm$^2$ with a monomer mixture of VdF/TFE/CTFE having a ratio in % by mole of 74/14/12. Then 0.2 g of ammonium persulfate and the monomer mixture of VdF/TFE/CTFE having a ratio in % by mole of 74/14/12 was supplied continuously so that the inside pressure of the vessel was maintained constant at 10 kgf/cm$^2$. The reaction was carried out for 33 hours. Then the temperature and pressure inside the vessel were returned to normal to give an aqueous dispersion of fluorine-containing polymer particles. With respect to the obtained aqueous dispersion, measurements were carried out as follows.

Solid content: The aqueous dispersion was dried at 150° C. for one hour in a vacuum dryer. The solid content is shown by a percentage of a weight after the drying to a weight of the aqueous dispersion before the drying.

Particle size: Measurement was carried out with a laser beam scattering particle size meter (DLS-3000 available from Otsuka Denshi)

The results are such that the solid content was 43% and the average particle size was 143 nm.

PREPARATION EXAMPLE 2

A 200-milliliter four neck flask provided with a stirrer, cooling tube and thermometer was charged with 100 g of the aqueous dispersion of the fluorine-containing polymer obtained in Preparation Example 1, and thereto was added 1.0 g of an aqueous solution of alkali salt of alkyl allyl sulfosuccinate (brand name ELEMINOL JS2 available from Sanyo Kasei Kogyo Kabushiki Kaisha) on the basis of a solid content. The mixture was heated with stirring in a water bath, and at the time when the bath temperature reached 80° C., to the mixture was added dropwise over one hour an emulsion prepared by emulsifying a monomer mixture comprising 20.0 g of methyl methacrylate (MMA), 6.0 g of butyl acrylate (BA), 1.0 g of acrylic acid (AAc) and 2.2 g of polyoxyethylene methacrylate (brand name M230G available from Shin-Nakamura Kaaku Kogyo Kabushiki Kaisha) with a 0.5% aqueous solution of alkali salt of alkyl allyl sulfosuccinate. Immediately after that, 1 ml of a 2% aqueous solution of ammonium persulfate was added to initiate a reaction. Three hours after initiation of the reaction, the temperature inside the bath was elevated to 85° C. and maintained for one hour. Then the mixture was cooled. After adjusting pH to 7 with ammonia water, filtration was carried out with a metal net of 300 mesh to give a bluish-white aqueous dispersion of fluorine-containing seed polymer particles. With respect to the aqueous dispersion, a solid content, minimum film forming temperature (MFT) and average particle size were measured. The results are shown in Table 1.

Minimum film forming temperature (MFT): A minimum temperature where a continuous film was obtained was measured by using a MFT measuring apparatus (available from Kabushiki Kaisha Riken Seiki Seisakusho).

PREPARATION EXAMPLES 3 to 5

Aqueous dispersions of particles of fluorine-containing seed polymer were obtained in the same manner as in Preparation Example 2 except that each component shown in Table 1 was used, and characteristics thereof were determined. The results are shown in Table 1.

Abbreviations in Table 1 are as follows.
MMA: Methyl methacrylate
BA: Butyl acrylate
HEMA: Hydroxyethyl methacrylate
AAc: Acrylic acid
MPTS: γ-Propoxytrimethoxysilyl methacrylate

TABLE 1

|  | Preparation Example | | | |
|---|---|---|---|---|
|  | 2 | 3 | 4 | 5 |
| Adding amount of aqueous dispersion of fluorine-containing polymer particles obtained in Preparation Example 1*1 (part by weight) | 100 (43) | 100 (43) | 100 (43) | 100 (43) |
| Radically polymerizable monomer (part by weight) | | | | |
| MMA | 20.0 | 17.0 | 17.0 | 21.0 |
| BA | 6.0 | 6.0 | 6.0 | 6.0 |
| HEMA | — | 3.0 | — | — |
| AAc | 1.0 | 1.0 | 1.0 | — |
| MPTS | — | — | 3.0 | — |
| Characteristics of aqueous dispersion | | | | |
| Solid content (% by weight) | 50 | 50 | 50 | 50 |
| MFT (° C.) | 23 | 28 | 29 | 31 |
| Average particle size (nm) | 157 | 163 | 159 | 156 |

*1Figures in the parentheses are solid contents (part by weight)

Example 1 to 8 and Comparative Examples 1 to 7
Preparation of White Coating

To the aqueous dispersions prepared in Preparation Examples 2 to 5, respectively were added and mixed colloidal silica and organoalkoxysilane in an amount shown in Table 2. Then thereto were added a dispersion prepared by mixing 25 parts of titanium oxide (brand name CR97 available from Ishihara Sangyo Kabushiki Kaisha), 2 parts of SN5027 (available from Nippon Nyukazai Kabushiki Kaisha) as a dispersing agent, 1 part of ethylene glycol as an anti-freezing agent, 0.5 part of FS ANTIFOAM 013B (available from Dow Corning Co., Ltd.) as an anti-foaming agent and 10 parts of water, and further 0.5 part of UH420 (available from Asahi Denka Kabushiki Kaisha) as a viscosity control agent and 10 parts of diethyl adipate as a film forming aid, followed by mixing sufficiently with a dispersing stirrer to give a coating.

After curing of the obtained coating at 30° C. for three days, the following measurements were carried out by using the cured coating. The results are shown in Table 2.
(Initial Characteristics of White Coating)

Gloss: The obtained coating was applied to a glass plate with a 10 mil applicator. After drying at room temperature for one week, a glossiness at 60° reflection was measured by using a gloss meter (available from Suga Shikenki Kabushiki Kaisha).

Pencil hardness: Measurement was carried out according to pencil hardness test of JIS K5400.
(Stain-proofing Property of White Coating)

The obtained coating was applied with a 10 mil applicator to an aluminum plate subjected to chemical conversion treatment and dried at room temperature for one week to give a test piece.

Stain-proofing property: A chromaticness index was measured with a differential calorimeter (CR300 available from Minolta Co., Ltd.) before and after outdoor exposure of the test piece set on an exposure rack placed at an angle of 30° being faced toward southern direction in Settsu-shi, Osaka Prefecture. A difference Δb in brightness between before and after the exposure was assumed to be an index for stain-proofness. The smaller the difference is, the less the adhesion of stains is.

Stain removable property: A water dispersion of carbon was sprayed onto the surface of the test piece and dried for 2 hours in a blower dryer of 60° C., followed by washing with a flowing water by using a brush. Chromaticity coordinates were measured with a calorimeter (CR300 available from Minolta Co., Ltd.) before and after the test. A difference Δb in brightness between before and after the test was assumed to be an index for stain-proofness. The smaller the difference is, the more excellent the stain removable property is.

Storage stability: The obtained coating was put in a 50 ml glass screw bottle and stored for two weeks in a constant temperature vessel of 50° C. A viscosity of the coating before and after stored was measured with a Brookfield type viscometer. The results are classified as follows.

A: A change in a viscosity of the coating is within a range of 80 to 150% of an initial viscosity B: A change in a viscosity of the coating is more than 150% and less than 200% of an initial viscosity C: A change in a viscosity of the coating exceeds 200% of an initial viscosity D: The whole coating is agglomerated It can be considered that the coatings which can stand under usual service conditions are those of the above levels A and B.

Example 9

To 50 parts of colloidal silica in a solid content was added 2.5 parts of γ-triethoxysilyl methacrylate, followed by mixing with stirring at 60° C. for two hours. Then 52.5 parts of the obtained aqueous dispersion was added and mixed to 100 parts of the aqueous dispersion of fluorine-containing seed polymer particles obtained in Preparation Example 2, and a coating was prepared in the same manner as in Example 1. Properties of the coating was evaluated. The results are shown in Table 2. It was recognized that storage stability was improved more as compared with Example 5 in which the aqueous dispersion of Preparation Example 4 was used.

Abbreviations in Table 2 are as follows.

CM40: Aqueous dispersion of colloidal silica (solid content: 40%) available from Nissan Kagaku Kabushiki Kaisha APZ-6613: Aqueous dispersion of colloidal silica (solid content: 35%) available from Nippon Yunika Kabushiki Kaisha MPTS: γ-Propoxytrimethoxysilyl methacrylate
MTrES: Methyltriethoxysilane

TABLE 2

| | Example | | | | | | | | | Comparative Example | | | | | | |
|---|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 | 7 |
| Aqueous dispersion of fluorine-containing polymer particles | | | | | | | | | | | | | | | | |
| Preparation Example No. | 2 | 2 | 2 | 3 | 4 | 2 | 2 | 2 | 2 | 2 | 2 | 2 | 2 | 2 | 2 | 5 |
| Amount amount*1 (part by weight) | 100 (50) | 100 (50) | 100 (50) | 100 (50) | 100 (50) | 100 (50) | 100 (50) | 100 (50) | 100 (50) | 100 (50) | 100 (50) | 100 (50) | 100 (50) | 100 (50) | 100 (50) | 100 (50) |
| Colloidal silica | | | | | | | | | | | | | | | | |
| CM40*1 (part by weight) | 75 (30) | 125 (50) | 125 (50) | 125 (50) | 125 (50) | 125 (50) | 125 (50) | 125 (50) | 50 (20) | 125 (50) | 400 (160) | 125 (50) | — | — | 125 (50) | — |
| APZ-6613*1 (part by weight) | — | — | 410 (144) | — | — | — | — | — | — | — | — | — | — | — | — | — |
| Organoalkoxysilane | | | | | | | | | | | | | | | | |
| MPTS (part by weight) | 2.5 | 2.5 | 2.5 | 2.5 | 2.5 | 0.2 | 9 | — | 2.5 | 2.5 | — | 5 | 10.5 | 5 | — | 2.5 |
| MTrES (part by weight) | — | — | — | — | — | — | — | 2.5 | — | — | — | — | — | — | — | — |
| Storage stability | B | B | B | A | A | B | B | B | A | C | D | C | B | C | B | D |
| Physical properties of coating film | | | | | | | | | | | | | | | | |
| Gloss | 65 | 62 | 53 | 71 | 71 | 51 | 67 | 59 | 71 | 65 | Cracking occurred | Cracking occurred | 70 | 68 | 66 | 72 |
| Pencil hardness | 2H | 3H | 4H | 4H | 4H | 2H | H | 3H | 4H | B | Cracking occurred | Cracking occurred | H | B | B | 2H |
| Stain-proofing property (ΔL) | 8.1 | 4.9 | 2.8 | 2.5 | 2.6 | 4.8 | 9.5 | 5.2 | 2.8 | 10.5 | Cracking occurred | Cracking occurred | 12.1 | 14.3 | 13.7 | 14.0 |
| Stain removable property (ΔL) | 9.7 | 7.1 | 6.4 | 4.6 | 4.8 | 5.8 | 9.7 | 6.1 | 6.1 | 11.2 | Cracking occurred | Cracking occurred | 9.3 | 27.2 | 24.6 | 13.1 |

*1Figures in the parentheses are solid contents (parts by weight).

Industrial Applicability

The present invention can provide the aqueous-dispersing composition of fluorine-containing polymer which gives a coating being excellent in storage stability and forming a coating film being excellent in stain-proofing property and stain removable property and having sufficient gloss and hardness.

What is claimed is:

1. An aqueous-dispersing composition comprising an aqueous dispersion of fluorine-containing polymer particles, a colloidal silica and an organoalkoxysilane, and containing said colloidal silica, in solid content, in an amount of more than 50 parts by weight up to 300 parts by weight and said organoalkoxysilane in an amount of 0.1 to 20 parts by weight on the basis of 100 parts by weight in solid content of an aqueous dispersion of fluorine-containing polymer particles, and said fluorine-containing polymer particles are fluorine-containing seed polymer particles which contain a fluoroolefin unit in an amount of 20 to 90% by mole on the basis of the whole seed polymer, and are obtained by seed-polymerizing a monomer having a reactive α,β-unsaturated group in the presence of fluorine-containing polymer particles.

2. The aqueous-dispersion composition of claim 1, wherein the fluorine-containing polymer in said aqueous dispersion of fluorine-containing polymer particles has at least one functional group selected from —OH group, —COOH group and a hydrolyzable silyl group.

3. A process for preparing the aqueous-dispersing composition of claim 1, in which an aqueous dispersion prepared by adding and condensing organoalkoxysilane in the presence of colloidal silica is added to the aqueous dispersion of fluorine-containing polymer particles.

4. A process for preparing the aqueous-dispersing composition of claim 2, in which an aqueous dispersion prepared by adding and condensing organoalkoxysilane in the presence of colloidal silica is added to the aqueous dispersion of fluorine-containing polymer particles.

* * * * *